US011442265B2

(12) United States Patent
Van Lierop et al.

(10) Patent No.: US 11,442,265 B2
(45) Date of Patent: *Sep. 13, 2022

(54) MONITORING OF MEMS MIRROR PROPERTIES

(71) Applicant: Infineon Technologies AG, Neubiberg (DE)

(72) Inventors: Hendrikus Van Lierop, Bj Weert (NL); Alexander Hulsker, Nijmegen (NL); Jaap Verheggen, Wijchen (NL)

(73) Assignee: Infineon Technologies AG

( * ) Notice: Subject to any disclaimer, the term of this patent is extended or adjusted under 35 U.S.C. 154(b) by 0 days.

This patent is subject to a terminal disclaimer.

(21) Appl. No.: 17/350,134

(22) Filed: Jun. 17, 2021

(65) Prior Publication Data

US 2021/0311300 A1    Oct. 7, 2021

Related U.S. Application Data

(63) Continuation of application No. 16/919,326, filed on Jul. 2, 2020, now Pat. No. 11,073,686, which is a (Continued)

(51) Int. Cl.
*G02B 26/08* (2006.01)
*G01N 21/95* (2006.01)
(Continued)

(52) U.S. Cl.
CPC ......... *G02B 26/0833* (2013.01); *G01N 21/55* (2013.01); *G01N 21/95* (2013.01);
(Continued)

(58) Field of Classification Search
CPC .............. G02B 26/0833; G02B 6/3514; G02B 6/3518; G02B 6/3584; G01S 17/894; G01S 7/4813; G01S 7/4815; G01S 7/4817; G01S 7/4863; G01S 7/4865; G01S 7/497; G01S 7/481; G01N 21/55; G01N 21/95
See application file for complete search history.

(56) References Cited

U.S. PATENT DOCUMENTS

2009/0201095 A1* 8/2009 Onuma ............... G02B 26/105
                                                              331/65
2010/0085618 A1* 4/2010 Fujii .................... G02B 26/105
                                                              359/199.1
(Continued)

*Primary Examiner* — Deoram Persaud
(74) *Attorney, Agent, or Firm* — Design IP (57) ABSTRACT

A method of monitoring a microelectromechanical systems (MEMS) oscillating structure includes: driving the MEMS oscillating structure configured to oscillate about a rotation axis according to an operating response curve during which the MEMS oscillating structure is in resonance, wherein the MEMS oscillating structure is a non-linear resonator; inducing an oscillation decay of the MEMS oscillating structure at predefined tilt angle such that an oscillation of the MEMS oscillating structure decays from the predefined tilt angle over a decay period; measuring at least one characteristic of the oscillation decay; and determining a mechanical health of the MEMS oscillating structure based on the at least one characteristic of the oscillation decay.

17 Claims, 6 Drawing Sheets

Related U.S. Application Data continuation of application No. 16/206,272, filed on Nov. 30, 2018, now Pat. No. 10,788,659.

(60) Provisional application No. 62/749,748, filed on Oct. 24, 2018.

(51) Int. Cl.
  *G02B 6/35* (2006.01)
  *G01N 21/55* (2014.01)

(52) U.S. Cl.
  CPC ......... *G02B 6/3514* (2013.01); *G02B 6/3518* (2013.01); *G02B 6/3584* (2013.01)

(56) References Cited

U.S. PATENT DOCUMENTS

| | | | |
|---|---|---|---|
| 2014/0300942 A1* | 10/2014 | Van Lierop et al. | G02B 26/0841 359/198.1 |
| 2014/0327946 A1* | 11/2014 | van Lierop et al. | B81C 1/00134 359/198.1 |
| 2018/0129036 A1* | 5/2018 | Haran | G01R 31/2829 |
| 2018/0164579 A1* | 6/2018 | Haran | G01R 19/04 |
| 2018/0284271 A1* | 10/2018 | Bogatscher | G01S 7/497 |
| 2018/0348506 A1* | 12/2018 | Duvdevany | G02B 26/105 |
| 2018/0356627 A1* | 12/2018 | Haran | G02B 26/105 |
| 2019/0101744 A1* | 4/2019 | Kinstlich | G02B 26/0833 |
| 2019/0129163 A1* | 5/2019 | Van Lierop | F16F 1/185 |
| 2019/0146210 A1* | 5/2019 | Maier | G02B 26/0833 359/200.8 |
| 2019/0310460 A1* | 10/2019 | Lin | G01S 17/42 |
| 2019/0361223 A1* | 11/2019 | Albert | G02B 26/0833 |

* cited by examiner

MONITORING OF MEMS MIRROR PROPERTIES

CROSS-REFERENCE TO RELATED APPLICATIONS

This application is a continuation of U.S. patent application Ser. No. 16/919,326 filed Jul. 2, 2020, which is a continuation of U.S. patent application Ser. No. 16/206,272 filed Nov. 30, 2018, which claims the benefit of U.S. Provisional Application Ser. No. 62/749,748 filed Oct. 24, 2018, which are incorporated by reference as if fully set forth.

FIELD

The present disclosure relates generally to a microelectromechanical systems (MEMS) oscillating system and method for operating the same, and, more particularly, to monitoring MEMS mirror properties.

BACKGROUND

Light Detection and Ranging (LIDAR), is a remote sensing method that uses light in the form of a pulsed laser to measure ranges (variable distances) to one or more objects in a field of view. In particular, a microelectromechanical systems (MEMS) mirror is used to scan light across the field of view. Arrays of photodetectors receive reflections from objects illuminated by the light, and the time it takes for the reflections to arrive at various sensors in the photodetector array is determined. This is also referred to as measuring time-of-flight (TOF). LIDAR systems form depth measurements and make distance measurements by mapping the distance to objects based on the time-of-flight computations. Thus, the time-of-flight computations can create distance and depth maps, which may be used to generate images.

MEMS mirrors operated at a certain resonance frequency are impacted by various systematic and non-systematic error sources. These errors may result in a considerable laser shooting/pointing error. For example, these issues may lead to a mismatch between expected mirror position and measured position. Since the precise measurement and estimation of the mirror's position is important for a MEMS-based LIDAR system, it may be important to be able to detect and compensate systematic and non-systematic error sources, or to signal a defect to an operator.

SUMMARY

Embodiments provide microelectromechanical systems (MEMS) mirror monitoring system and methods for operating the same, and, more particularly, to monitoring an operation and properties of a non-linear resonant MEMS oscillating structure.

A system includes a MEMS oscillating structure configured as a non-linear resonator to oscillate about a rotation axis; a driver configured to generate a driving force for driving the MEMS oscillating structure about the rotation axis according to an operating response curve during which the MEMS oscillating structure is in resonance, the driver further configured to decrease the driving force when the MEMS oscillating structure is at a predefined tilt angle to induce an oscillation decay of the MEMS oscillating structure over a decay period; a measurement circuit configured to measure an oscillation frequency and a tilt angle amplitude of the MEMS oscillating structure during the decay period; and at least one processor configured to determine at least one characteristic of the MEMS oscillating structure based on at least one of the measured oscillation frequency and the measured tilt angle amplitude.

A method of monitoring a MEMS oscillating structure includes driving the MEMS oscillating structure configured to oscillate about a rotation axis according to an operating response curve during which the MEMS oscillating structure is in resonance, where the MEMS oscillating structure is a non-linear resonator; inducing an oscillation decay of the MEMS oscillating structure at predefined tilt angle such that an oscillation of the MEMS oscillating structure decays fully from the predefined tilt angle over a decay period; measuring an oscillation frequency and a tilt angle amplitude of the MEMS oscillating structure during the decay period; and determining at least one characteristic of the MEMS oscillating structure based on at least one of the measured oscillation frequency and the measured tilt angle amplitude.

BRIEF DESCRIPTION OF THE DRAWINGS

Embodiments are described herein making reference to the appended drawings.

DETAILED DESCRIPTION

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. Additionally, further features or elements in addition to the ones explicitly shown and described may be provided, for example conventional components of sensor devices.

Features from different embodiments may be combined to form further embodiments, unless specifically noted otherwise. Variations or modifications described with respect to one of the embodiments may also be applicable to other embodiments. In some instances, well-known structures and devices are shown in block diagram form rather than in detail in order to avoid obscuring the embodiments.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

Embodiments relate to optical sensors and optical sensor systems and to obtaining information about optical sensors and optical sensor systems. A sensor may refer to a component which converts a physical quantity to be measured to an electric signal, for example a current signal or a voltage signal. The physical quantity may, for example, comprise electromagnetic radiation, such as visible light, infrared (IR) radiation, or other type of illumination signal, a current, or a voltage, but is not limited thereto. For example, an image sensor may be a silicon chip inside a camera that converts photos of light coming from a lens into voltages. The larger the active area of the sensor, the more light that can be collected to create an image.

A sensor device as used herein may refer to a device which comprises a sensor and further components, for example biasing circuitry, an analog-to-digital converter or a filter. A sensor device may be integrated on a single chip, although in other embodiments a plurality of chips or also components external to a chip may be used for implementing a sensor device.

In LIDAR systems, a source transmits light pulses and/or beams into a field of view and the light reflects from one or more objects by backscattering. In particular, LIDAR is a direct Time-of-Flight (TOF) system in which the light pulses (e.g., laser pulses of infrared light) are emitted into the field of view, and a pixel array detects and measures the reflected pulses. For example, an array of photodetectors receive reflections from objects illuminated by the light.

Differences in return times for each light pulse across multiple pixels of the pixel array can then be used to make digital 3D representations of an environment or to generate other sensor data. For example, the light source may emit a single light pulse, and a time-to-digital converter (TDC) electrically coupled to the pixel array may count from the time the light pulse is emitted until a time the reflected light pulse is received at the receiver (i.e., at the pixel array). The "time-of-flight" of the light pulse is then translated into a distance.

A scan such as a oscillating horizontal scan (e.g., from left to right and right to left of a field of view) can illuminate a scene in a continuous scan fashion. By emitting successive light pulses in different scanning directions, an area referred to as the "field of view" can be scanned and objects within the area can be detected and imaged. A raster scan could also be used.

Figure 1A:
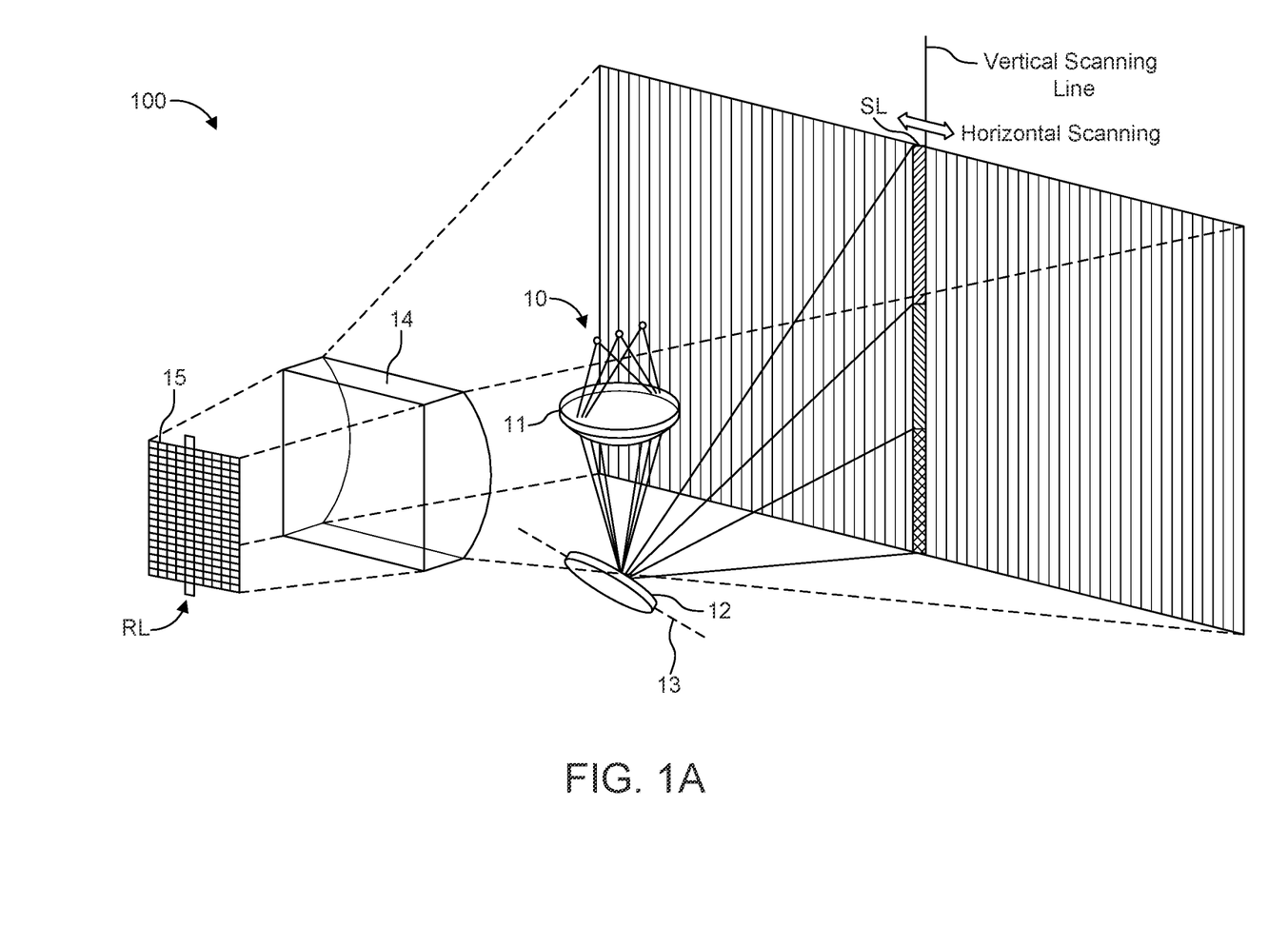
FIG. 1A is a schematic diagram of a LIDAR scanning system in accordance with one or more embodiments.

FIG. 1A is a schematic diagram of a LIDAR scanning system 100 in accordance with one or more embodiments. The LIDAR scanning system 100 is an optical scanning device that includes a transmitter, including an illumination unit 10, a transmitter optics 11, and a one-dimensional (1D) microelectromechanical systems (MEMS) mirror 12, and a receiver, including a second optical component 14 and a photodetector detector array 15.

The illumination unit 10 includes multiple light sources (e.g., laser diodes or light emitting diodes) that are linearly aligned in single bar formation and are configured to transmit light used for scanning an object. The light emitted by the light sources is typically infrared light although light with other wavelength might also be used. As can be seen in the embodiment of FIG. 1A, the shape of the light emitted by the light sources is spread in a direction perpendicular to the transmission direction to form a light beam with an oblong shape perpendicular to a transmission. The illumination light transmitted from the light sources are directed towards the transmitter optics 11 configured to focus each laser onto a one-dimensional MEMS mirror 12. The transmitter optics 11 may be, for example, a lens or a prism.

When reflected by the MEMS mirror 12, the light from the light sources are aligned vertically to form for each emitted laser shot a one-dimensional vertical scanning line SL of infrared light or a vertical bar of infrared light. Each light source of the illumination unit 10 contributes to a different vertical region of the vertical scanning line SL. Thus, the light sources may be concurrently activated and concurrently deactivated to obtain a light pulse with multiple segments, where each segment corresponds to a respective light source, However, each vertical region or segment of the vertical scanning line SL may also be independently active or inactive by turning on or off a corresponding one of the light sources of the illumination unit 10. Thus, a partial or full vertical scanning line SL of light may be output from the system 100 into the field of view.

Accordingly, the transmitter of the system 100 is an optical arrangement configured to generate laser beams based on the laser pulses, the laser beams having an oblong shape extending in a direction perpendicular to a transmission direction of the laser beams.

In addition, while three laser sources are shown, it will be appreciated that the number of laser sources are not limited thereto. For example the vertical scanning line SL may be generated by a single laser source, two laser sources or more than three laser sources.

The MEMS mirror 12 is a mechanical moving mirror (i.e., a MEMS micro-mirror) integrated on a semiconductor chip (not shown). The MEMS mirror 12 according to this embodiment is suspended by mechanical springs (e.g., leaf springs, sometimes referred to as cantilever beams) or flexures and is configured to rotate about a single axis and can be said to have only one degree of freedom for movement. Due to this single axis of rotation, the MEMS mirror 12 is referred to as a 1D MEMS mirror.

In order to make a MEMS scanning mirror robust against vibrations, the mirror should have a low inertia, i.e., a light and stiff mirror body. In addition, the mirror should have a high stiffness of its suspension for all degrees-of-freedom (DOF) of the mirror body.

In order to achieve a light and stiff mirror body, the mirror body may comprise a relatively thin mirror and a thicker reinforcement structure for the mirror. The mirror body may be rotatably arranged in a mirror frame around a rotation axis extending in a plane defined by the mirror frame. The rotation axis may extend to first and second mutually opposite end-portions of the mirror body. The mirror may have a reflective plane on a first main surface and opposite the first main surface a second main surface provided with the reinforcement structure.

Figure 1B:
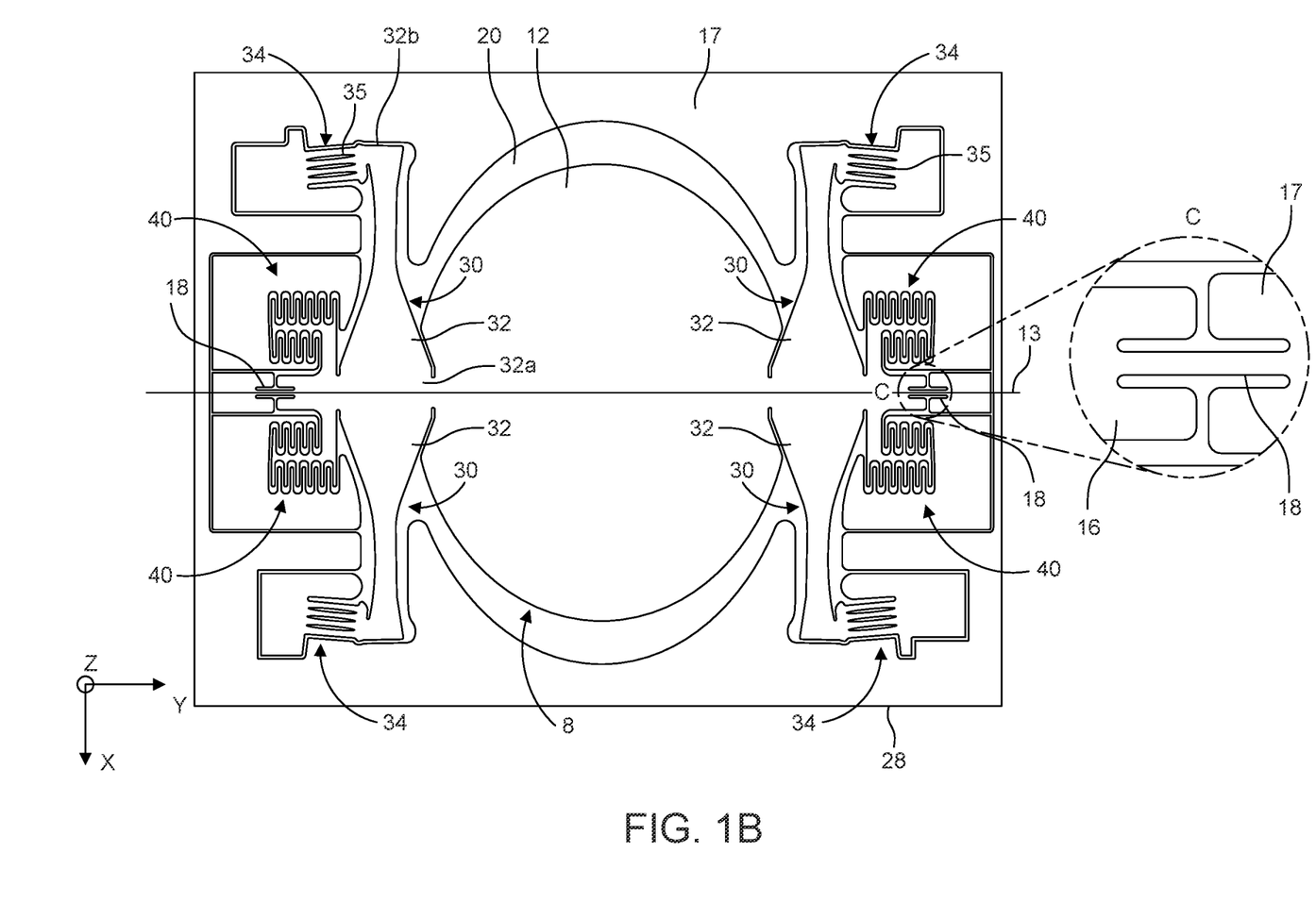
FIG. 1B shows a schematic top view of an example of a mirror device in accordance with one or more embodiments.

In order to achieve a high stiffness suspension, the mirror body may be supported in the mirror frame using support beams extending along the rotation axis and additional cantilever beam or leaf spring assemblies, as illustrated in FIG. 1B. Generally, as defined herein, leaf spring assemblies may be referred to a cantilever beam assemblies, and vice versa. Similarly, leaf springs and cantilever beams may be used interchangeably.

A cantilever beam assembly may have a longitudinal direction and may extend within the plane defined by the frame. The support beams may be connected between the mirror body and the frame at two opposite ends of the mirror body along the rotation axis. The cantilever beam assembly may have a cantilever beam coupled at a first end via a relief structure to the mirror frame and fixed at a second end to the mirror body. The cantilever beam may have a thickness, perpendicular to a plane of the frame, that is smaller than its width in the plane of the frame.

Results of the low inertia and the high suspension stiffness of the mirror body may be high resonance frequencies a good dynamic performance. These properties may also make the device which is operated at the resonance frequency around the main axis of rotation very fast. In normal operation, i.e., at resonance, accelerations at the mirror tips of typically 10000 G may be achieved. This may make any external vibration negligible.

The MEMS mirror 12 exhibits a non-linear behavior due the stiffness of the suspension structure (i.e., the cantilever beams) such that an oscillation frequency of the mirror increases with an increase in oscillation amplitude (i.e., tilt angle amplitude) in a non-linear manner. Thus, the stiffening of the suspension causes the MEMS mirror 12 to be more strongly non-linear.

Figure 2:
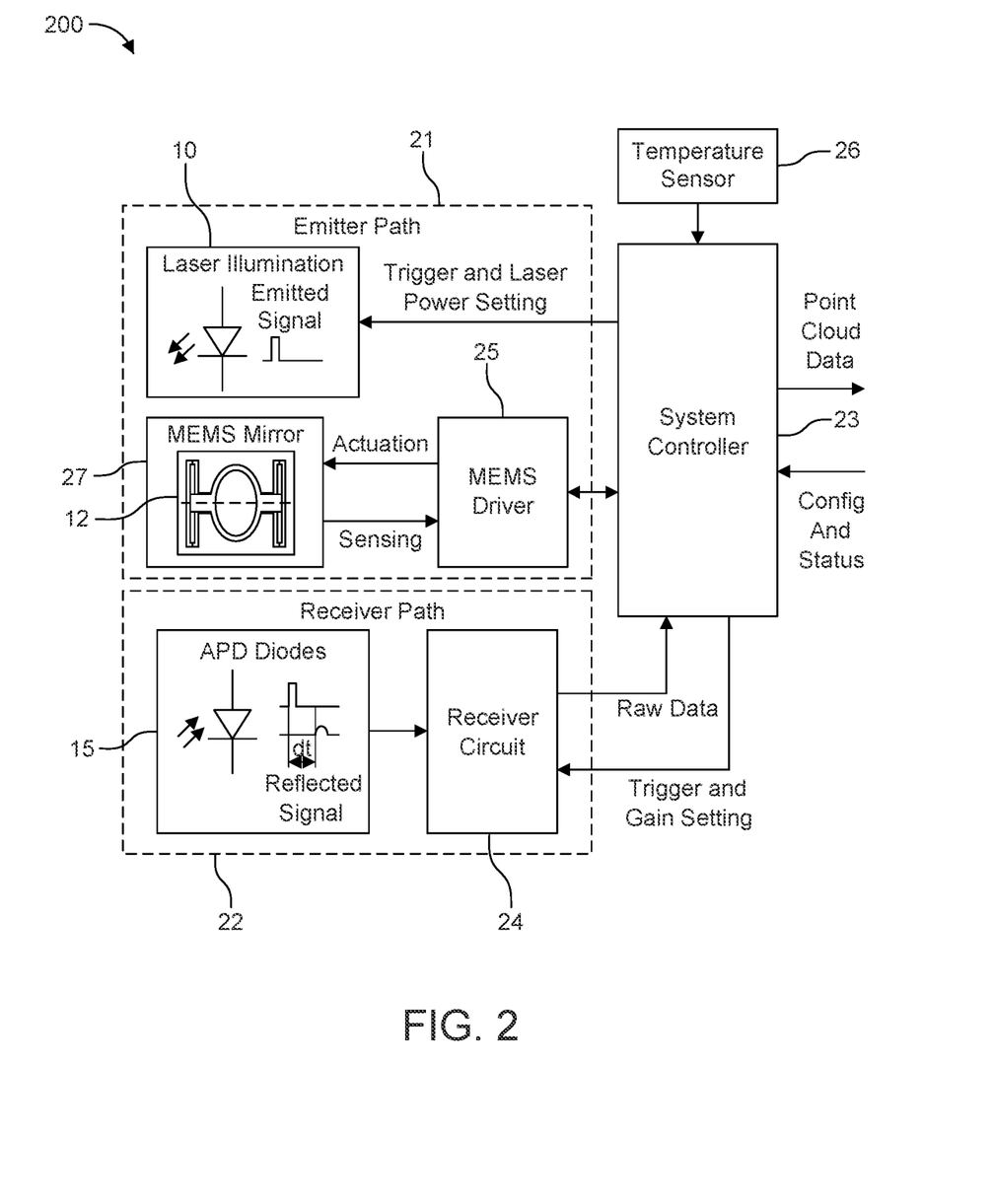
FIG. 2 is a schematic block diagram of the LIDAR scanning system in accordance with one or more embodiments.

The MEMS mirror 12 may be assembled in a chip package 27 shown in FIG. 2 to protect the mirror. For example, the MEMS mirror 12 may be hermetically sealed at a low pressure (i.e., at a pressure lower than atmospheric pressure) in a chip package. This low pressure may provide a low stress environment in which the MEMS mirror 12 operates.

Conceivable packages may include or differ by one or more of the following variants: different substrates (e.g., metal (leadframe), ceramic, organic (similar to printed circuit board (PCB) material)), and different optical lids or covers (e.g., optical material of glass, silicon, sapphire, etc.). Furthermore, the optical lids or covers may be cavity-forming caps, may be integrated into a frame (e.g., a metal frame), or assembled onto a pre-mold cavity or a ceramic cavity.

One or more methods (e.g., adhesive bonding, gluing, soldering, welding, and the like) or one or more different materials (e.g., silicone, glass solder, AuSn, and the like) may be used to bond one or more elements together (e.g., joining cap or lid to substrate). It will be appreciated that bonding methods may be interchangeable across various embodiments disclosed herein.

Alternatively, a wafer-level approach may be used such that a cavity-shaped lid may be directly mounted onto the MEMS chip (or even on wafer-level prior to singulation). Here, if the lid attachment leaves the electrical pads exposed, the sub-mount chip/lid can further be processed into a package using molding or casting processes.

The MEMS mirror 12 itself is a non-linear resonator (i.e., a resonant MEMS mirror) configured to oscillate "side-to-side" about a single scanning axis 13 at a resonance frequency such that the light reflected from the MEMS mirror 12 (i.e., the vertical scanning line of light) oscillates back and forth in a horizontal scanning direction. The MEMS mirror 12 is more strongly non-linear due to the stiffening of the suspension. A scanning period or an oscillation period is defined, for example, by one complete oscillation from a first edge of the field of view (e.g., left side) to a second edge of the field of view (e.g., right side) and then back again to the first edge. A mirror period of the MEMS mirror 12 corresponds to a scanning period.

Thus, the field of view is scanned in the horizontal direction by the vertical bar of light by changing the angle of the MEMS mirror 12 on its scanning axis 13. For example, the MEMS mirror 12 may be configured to oscillate at a resonance frequency of 2 kHz, between +/−15 degrees to steer the light over 30 degrees making up the scanning range of the field of view. Thus, the field of view may be scanned, line-by-line, by a rotation of the MEMS mirror 12 through its degree of motion. One such sequence through the degree of motion (e.g., from −15 degrees to +15 degrees) is referred to as a single scan or scanning cycle. Multiple scans may be used to generate distance and depth maps, as well as 3D images by a processing unit. The horizontal resolution of the depth maps and images depends on the size of the incremental steps in rotation angle of the MEMS mirror 12 taken between scans.

While the transmission mirror is described in the context of a MEMS mirror, it will be appreciated that other 1D mirrors can also be used. In addition, the resonance frequency or the degree of rotation is not limited to 2 kHz and +/−15 degrees, respectively, and both the resonance frequency and the field of view may be increased or decreased according to the application. Thus, a one-dimensional scanning mirror is configured to oscillate about a single scanning axis and direct the laser beams at different directions into a field of view. Hence, a transmission technique includes transmitting the beams of light into the field of view from a transmission mirror that oscillates about a single scanning axis such that the beams of light are projected as a vertical scanning line SL into the field of view that moves horizontally across the field of view as the transmission mirror oscillates about the single scanning axis.

Upon impinging one or more objects, the transmitted bar of vertical light is reflected by backscattering back towards the LIDAR scanning system 100 as a reflected vertical line where the second optical component 14 (e.g., a lens or prism) receives the reflected light. The second optical component 14 directs the reflected light onto the photodetector detector array 15 that receives the reflected light as a receiving line RL and is configured to generate electrical measurement signals. The electrical measurement signals may be used for generating a 3D map of the environment and/or other object data based on the reflected light (e.g., via TOF calculations and processing).

The receiving line is shown as a vertical column of light that extends along one of the pixel columns in a lengthwise direction of the pixel column. The receiving line has three regions that correspond to the vertical scanning line SL shown in FIG. 1A. As the vertical scanning line SL moves horizontally across the field of view, the vertical column of light RL incident on the 2D photodetector array 15 also moves horizontally across the 2D photodetector array 15. The reflected light beam RL moves from a first edge of the photodetector detector array 15 to a second edge of the photodetector detector array 15 as the receiving direction of the reflected light beam RL changes. The receiving direction of the reflected light beam RL corresponds to a transmission direction of the scanning line SL.

The photodetector array 15 can be any of a number of photodetector types; including avalanche photodiodes (APD), photocells, and/or other photodiode devices. Imaging sensors such as charge-coupled devices (CCDs) can be the photodetectors. In the examples provided herein, the photodetector array 15 is a two-dimensional (2D) APD array that comprises an array of APD pixels. In other embodiments, the photodetector array 15 may be a 1D array that includes a single column of photodiodes. The activation of the photodiodes may be synchronized with light pulses emitted by the illumination unit 10.

The photodetector array 15 receives reflective light pulses as the receiving line RL and generates electrical signals in response thereto. Since the time of transmission of each light pulse from the illumination unit 10 is known, and because the light travels at a known speed, a time-of-flight computation using the electrical signals can determine the distance of objects from the photodetector array 15. A depth map can plot the distance information.

In one example, for each distance sampling, a microcontroller triggers a laser pulse from each of the light sources of the illumination unit 10 and also starts a timer in a Time-to-Digital Converter (TDC) Integrated Circuit (IC). The laser pulse is propagated through the transmission optics, reflected by the target field, and captured by an APD of the APD array 15. The APD emits a short electrical pulse which is then amplified by an electrical signal amplifier. A comparator IC recognizes the pulse and sends a digital signal to the TDC to stop the timer. The TDC uses a clock frequency to calibrate each measurement. The TDC sends the serial data of the differential time between the start and stop digital signals to the microcontroller, which filters out any error reads, averages multiple time measurements, and calculates the distance to the target at that particular field position. By emitting successive light pulses in different directions established by the MEMS mirror, an area (i.e., a field of view) can be scanned, a three-dimensional image can be generated, and objects within the area can be detected.

FIG. 1B shows a schematic top view of an example of a mirror device in accordance with one or more embodiments. Referring to FIG. 1B, an example of a mirror device, such as a MEMS scanning micro mirror, is now explained. The mirror device comprises a mirror body 8. The mirror body 8 comprises a mirror 12 and a mirror support 16. The mirror device further includes a frame 17. The mirror body 8 is arranged in the frame 17. The frame 17 defines a plane, i.e., the (x, y) plane in FIG. 1B. The plane defined by the frame 17 may be parallel to planes defined by main surfaces of a layer or a plurality of layers in which the frame 17 is formed.

The mirror body 8 is rotatable around a rotation axis 13 extending in the plane de-fined by the frame 17. Support beams 18, which may also be referred to as torsion beams, are connected between the mirror body 8 and the frame 17 along the rotation axis 13. To be more specific, a first support beam 18 is connected between a first end of the mirror body 8 and the frame 17 and a second support beam 18 is connected between a second end of the mirror body 8 and the frame 17, where the second end of the mirror body 8 is opposite to the first end in the direction of the rotation axis 13. An enlarged view of one of the support beams 18 is shown in the enlarged portion C in the right hand side of FIG. 1B. As can be seen, support beams 18 connect parts of mirror support 16 to parts of frame 17 and permit the mirror body 8 to be rotated around rotation axis 13. The support beams 18 may be collinear with the rotation axis 13.

Those skilled in the art will appreciate that the shape of the mirror 12 can be any shape desired for a particular application, e.g., a circle, ellipse, square, rectangle or other shape as desired.

The mirror frame 17 defines a mirror recess 20 in which the mirror body 8 is arranged. The mirror recess 20 is defined by a recess periphery 28 of the mirror frame 17. The mirror frame 17 may also be structured to define further recesses in which other components may be arranged, such as actuators and leaf spring assemblies.

The mirror device includes at least one leaf spring assembly 30. In the example shown, the mirror device includes two pairs of leaf spring assemblies 30, where the leaf spring assembly in each pair extends from the mirror body 8 in opposite directions. In the example shown, the leaf spring assemblies 30 are arranged symmetrically with respect to the axis of rotation 13.

The at least one leaf spring assembly 30 includes a leaf spring 32 and a relief link 34. The relief link 34 may have one or more relief springs 35. The leaf spring 32 includes a first end 32a and a second end 32b. The first end 32a is coupled to the mirror body 8 and the second end is coupled to the frame 17. Each leaf spring 32 has a longitudinal direction or extension between the first end 32a and the second end 32b. The first end 32a is fixed to the mirror support (not illustrated) and the second end 32b is coupled to frame 17 via the relief link 34. In the examples, the first ends 32a of two leaf springs 32 extending from the same portion of the mirror body 8 in different directions may be connected to each other (e.g., the leaf springs of the left side of the mirror 12 or the leaf springs on the right side of the mirror 12).

In some examples, the shape of the mirror 12 may include concave portions in the region of the axis of rotation 13, wherein portions of the leaf springs 32 extend into the concave portions of the mirror 12. In some examples, leaf springs 32 and mirror 12 may be formed in a same layer of material and may be connected to each other adjacent the axis of rotation 13.

In some examples, the leaf springs 32 may be implemented in a single crystal silicon layer having a direction of lower material stiffness, where the leaf springs have their longitudinal direction aligned with the direction of lower material stiffness. In some examples, the leaf springs 32 may be implemented in a silicon layer having a <100> axis and the leaf springs have their longitudinal direction aligned with the <100> direction which in this case has the lower material stiffness.

Torsional stiffness about the rotation axis 13 may be set using the leaf spring assemblies 30. The pair of support beams 18 supports the mirror body 8 vertically, i.e., perpendicular to a main surface of the frame 17, at the rotation axis 13. However, the support beams 18 may have a negligible effect on the torsional stiffness, so that the natural frequency of the mirror body may be substantially determined by the leaf spring assemblies 30. The natural frequency may be substantially independent of the support beams 18. The natural frequency as defined herein is the undamped frequency of the mirror body 8 (i.e., the mirror 12) about its rotation axis 13. The support beams 18 may define the out-of-plane rocking and vertical mode stiffness for the corresponding dynamic modes and corresponding resonance frequencies. The torsional stiffness can be decoupled from the out-of-plane rocking and vertical mode stiffness so that the out-of-plane rocking and vertical mode frequencies can be set to desired values, such as higher values, without influencing the torsional mode stiffness and resonance frequency. As defined herein, the Y axis is along the rotation axis 13, the X axis is perpendicular to the Y axis on the mirror plane when the mirror 12 is at rest, and the Z axis is perpendicular to and out of the mirror plane when the mirror 12 is at rest. The X, Y, and Z axis are axes of a tree dimensional Cartesian coordinate system.

In the example shown in FIG. 1B, one end of the at least one leaf spring 32 is connected to the mirror body 8 at a location close to the rotation axis 13. The other end 32b is connected to the associated relief link 34 at a location further away from the rotation axis 13. The leaf spring assemblies 30 may provide torsional stiffness to the mirror body 8 about the rotation axis 13. The relief links 34 may provide a compliant or flexible coupling from the leaf springs 32 to the frame 17. The relief links 34 may have a relatively low stiffness longitudinal to the leaf springs 32, i.e., in X direction in FIG. 1B, which allows one end of the leaf springs 32 to move in their longitudinal direction when the mirror body 8 rotates around the rotation axis 13. The relief links 34 may have a relatively high stiffness in the transverse direction, i.e., in Z direction and in Y direction in FIG. 1B.

The resonance frequency for rotation of the mirror 12 around the rotation axis 13 may be defined mainly by the inertia of the mirror body 8 and the stiffness of the leaf spring assemblies 30, which may be defined by the bending stiffness of the leaf springs 32 and by the torsional and translational stiffness of the relief links 34. The bending stiffness of the leaf springs 32 may be defined by the length, width, and, in particular, the thickness of the leaf springs 32. The combined stiffness in X direction of the support beams 18 and the relief links 34 may prevent movement of the mirror body 8 perpendicular to the rotation axis 13 (in the X direction) during operation. More detail on the relief links is provided be-low.

The support beams 18 are connected between the frame 17 and the mirror body 8 along the rotation axis 13 to support the mirror body 8 in the frame 17. In one example, the support beams 18 have narrow rectangular cross-sections perpendicular to the rotation axis 13, with the long axis of the rectangle perpendicular to the face of the mirror 12 and the mirror body 8, and the short axis of the rectangle parallel to the face of the mirror 12. The torsional stiffness corresponding to a rotation of the mirror body 8 around rotation axis 13 may be provided by the leaf spring assemblies 30. The support beams 18 may serve only for support of the mirror body 8 and may have a negligible effect on the torsional stiffness. The support beams 18 may be sized so that the stiffness against vertical displacement (in Z direction) of the mirror body 8 and against its out-of-plane translation perpendicular to the rotation axis 13 (the X axis) may be as high as possible.

The mirror device may also include at least one actuator 40 to provide torque to drive the mirror body 8 about the rotation axis 13. In one example, the actuator may include mirror combs attached to the mirror body 8 interleaved with frame combs attached to the frame 17. Applying a difference in electrical potential between interleaved mirror combs and frame combs may create a driving force between the mirror combs and the frame combs, which may create a torque on the mirror body 8 about the rotation axis 13. An oscillating electrical potential can be applied to drive the mirror device at its natural frequency.

In other examples, actuation methods may include electromagnetic actuation and piezoelectric actuators. In electromagnetic actuation, the micro mirror may be "immersed" in a magnetic field and an alternating electric current through conductive paths may create the oscillating torque around the rotation axis 13. Piezoelectric actuators may be integrated in the leaf springs or the leaf springs may be made of piezoelectric material to produce alternating beam bending forces in response to an electrical signal and generate the oscillation torque.

The MEMS mirror 12 exhibits a non-linear behavior due the torsional stiffness about the rotation axis 13 caused by the leaf spring assemblies 30 such that an oscillation frequency of the mirror 12 increases with an increase in oscillation amplitude (i.e., tilt angle amplitude) in a non-linear manner. Thus, the stiffening of the leaf springs 32 as the mirror rotates causes the MEMS mirror 12 to be more strongly non-linear.

FIG. 2 is a schematic block diagram of the LIDAR scanning system 200 in accordance with one or more embodiments. In particular, FIG. 2 shows additional features of the LIDAR scanning system 200, including example processing and control system components such as a MEMS driver, a receiver circuit, and a system controller.

The LIDAR scanning system 200 includes a transmitter unit 21 that is responsible for an emitter path of the system 200, and a receiver unit 22 that is responsible for a receiver path of the system 200. The system also includes a system controller 23 that is configured to control components of the transmitter unit 21 and the receiver unit 22, and to receive raw data from the receiver unit 22 and perform processing thereon (e.g., via digital signal processing) for generating object data (e.g., point cloud data). Thus, the system controller 23 includes at least one processor and/or processor circuitry for processing data, as well as control circuitry, such as a microcontroller, that is configured to generate control signals. The LIDAR scanning system 200 may also include a temperature sensor 26.

The receiver unit 22 includes the photodetector array 15 as well as a receiver circuit 24. The receiver circuit 24 may include one or more circuitries or sub-circuitries for receiving and/or processing information. The receiver circuit 24 may receive the analog electrical signals from the APD diodes of the photodetector array 15 and transmit the electrical signals as raw analog data or raw digital data to the system controller 23. In order to transmit the raw data as digital data, the receiver circuit 24 may include an analog-to-digital converter (ADC) and a field programmable gate array (FPGA). The receiver circuit 24 may also receive trigger control signals from the system controller 23 that triggers an activation of one or more APD diodes. The receiver circuit 24 may also receive gain setting control signals for controlling the gain of one or more APD diodes.

The transmitter unit 21 includes the illumination unit 10, the MEMS mirror 12, and a MEMS driver 25 configured to drive the MEMS mirror 12. In particular, the MEMS driver 25 actuates and senses the rotation position of the mirror, and provides position information (e.g., tilt angle or degree of rotation about the rotation axis) of the mirror to the system controller 23. Based on this position information, the laser sources of the illumination unit 10 are triggered by the system controller 23 and the photodiodes (e.g., APD diodes) are activated to sense, and thus measure, a reflected light signal. Thus, a higher accuracy in position sensing of the MEMS mirror results in a more accurate and precise control of other components of the LIDAR system.

The MEMS driver 25 may also measure and record mirror frequency and currents using a change in capacitance in a comb-drive rotor and stator of an actuator structure used to drive the MEMS mirror 12. The actuator structure of the MEMS mirror 12 further includes the suspension structure discussed above. Thus, the MEMS driver 25 may further include a measurement circuit configured to measure one or more characteristics of the MEMS mirror 12 described herein. The MEMS driver 25 may further include processing circuitry, including at least one processor (e.g., analog signal processing circuitry and/or digital signal processing circuitry) configured to process measurement information from the measurement circuit to evaluate a mechanical health of the MEMS mirror 12 and/or the state of the chip package.

Additionally or alternatively, the system controller 23 may receive measurement information from the measurement circuit of the MEMS driver 25 and perform processing thereon. Thus, system controller 23 may further include processing circuitry, including at least one processor (e.g., analog signal processing circuity and/or digital signal processing circuitry) configured to process measurement information from the measurement circuit to evaluate a mechanical health of the MEMS mirror 12 and/or the state of the chip package.

By sensing the rotation position of the MEMS mirror 12 about its rotation axis 13, the MEMS driver 25 can sense zero-crossing events of the MEMS mirror 12. A zero-crossing event is an instance when the MEMS mirror 12 has a rotation angle of 0° on its rotation axis 13. Specifically, it is the moment when the MEMS mirror 12 is parallel to the frame or in a neutral position. The neutral position may also be referred to as a resting position (e.g., when the MEMS mirror 12 comes to a stop after turning off the driving force). Since the MEMS mirror 12 oscillates back and forth between two rotation directions (e.g., clock-wise and counter-clockwise), a zero-crossing event occurs twice during a scanning period—once as the mirror oscillates in the first rotation direction, and once as the mirror oscillates in the second rotation direction.

In some embodiments, an event time may correspond to a non-zero crossing event. For example, the sensed rotation angle may be some angle other than 0°. However, for the purpose of explanation, examples herein will be described in the context of sensing zero-crossing events.

The MEMS driver 25 is configured to detect each zero-crossing event and record a timing for each event. This timing information (i.e., measured zero-crossing time) can then be compared by the MEMS driver 25 with an expected zero-crossing time for each zero-crossing to detect asymmetries in the movement of the MEMS mirror 12. The MEMS driver 25 may also send the position information to the system controller 23 so that the system controller 23 can use the position information to control the triggering of the laser pulses of the illumination unit 10 and the activation of the photodiodes of the photodetector array 15. The position information may also be used by the system controller as feedback information such that the system controller 23 can maintain a stable operation of the MEMS mirror 12 via control signals provided to the MEMS driver 25.

The MEMS mirror 12 includes an actuator structure used to drive the mirror. The actuator structure includes inter-digitated finger electrodes made of interdigitated mirror combs and frame combs to which a drive voltage (i.e., an actuation signal) is applied by the MEMS driver 25. The drive voltage applied to the finger structure generates a corresponding capacitance. The drive voltage across the finger structure creates a driving force between interdigitated mirror combs and the frame combs, which creates a torque on the mirror body about the rotation axis. The drive voltage can be switched or toggled on and off resulting in an oscillating driving force. The oscillating driving force causes the mirror to oscillate back and forth on its rotation axis between two extrema.

In other embodiments, an electromagnetic actuator may be used to drive the MEMS mirror 12. For an electromagnetic actuator, a driving current may be used to generate the oscillating driving force. Thus, it will be appreciated that drive/driving voltage and drive/driving current may be used interchangeably herein, and both may generally be referred to as a driving force.

As the mirror oscillates, the capacitance between the finger electrodes changes according to the mirror's rotation position. The MEMS driver 25 is configured to measure the capacitance between the interdigitated finger electrodes, and determine a rotation position or angle position of the MEMS mirror 12 therefrom. By monitoring the capacitance, the MEMS driver 25 can detect the zero-crossing events and a timing thereof, and can determine the tilt angle of the MEMS mirror 12. The MEMS driver 25 can also use the measured capacitance to determine a mirror frequency, and record the information in memory at the MEMS driver 25 or at the system controller 23.

The sensing of the position (i.e., the tilt angle) of the MEMS mirror 12 is performed based on a detector that is configured to measure the capacitance. For example, as the MEMS mirror moves, the geometry of the finger structure changes, resulting in a change in the geometry of the capacitance. As the geometry of the capacitance changes, the capacitance itself changes. Thus, a specific capacitance corresponds directly with a specific position (i.e., tilt angle) of the MEMS mirror. By sensing the capacitance of the finger structure, the MEMS driver 25 can monitor and track the oscillations of the mirror, and determine a specific position of the MEMS mirror.

One way to measure the capacitance is to measure a current flowing through the finger structure, convert the measured current into a voltage, and then further correlate the voltage to a capacitance and/or a rotation angle. However, any method to measure the capacitance may be used. A rotation direction (e.g., positive or negative, left-to-right or right-to-left, clockwise or counter-clockwise, etc.) is also detected by measuring a change in capacitance over time, where a positive or a negative change indicates opposing rotation directions. The MEMS driver 25 can also record the currents and voltages measured during the measuring of the capacitance. Thus, increasing the accuracy of position sensing of the mirror may improve the overall accuracy of the LIDAR system Since the mirror is driven at an oscillation frequency (e.g., 2 kHz), when the mirror rotates in a first rotation direction (e.g., left-to-right or clockwise), it crosses a zero position (i.e., 0°) at a certain point of time. The same can be said when the mirror rotates in a second rotation direction (e.g., right-to-left or counter-clockwise), the mirror will cross the zero position at a certain point in time. These instances of crossing the zero position may be referred to as zero-crossing events which occur at zero-crossing times.

However, due to variabilities introduced during manufacturing and by aging of the mirror, asymmetries in the mirror may exist and may change over time. These asymmetries cause differences in timing between movement in the first rotation direction compared to movement in the second rotation direction. Said differently, the time interval between two zero-crossings where the later of the two zero crossings is in the first rotation direction may differ from the time interval where the later of the two zero crossings is in the second rotation direction. In addition, one or both zero crossings may deviate from an expected zero-crossing calculated based on the oscillation frequency.

In addition, an operating point and MEMS mirror properties depend on certain environmental parameters, such as temperature, pressure, and vibration. The MEMS mirror properties include, for example, frequency, angle, drive voltage, phase, Young's modulus, asymmetries in capacitive sensing signals (e.g., left vs. right, either in scan direction or actuator quadrants), Q-factor, and damping factor or other damping parameter.

The operating point and MEMS mirror properties may drift over a lifetime of the MEMS mirror 12, or with external stresses, with leakage of the MEMS package, change of package atmosphere/conditions, aging of adhesive, and so on. Thus, monitoring of these MEMS mirror properties, including monitoring the drift of the properties over the lifetime, and/or calibration may be used to cancel out the external influences, verify correct mounting and handling, monitor life time performance, detect leakage of a hermetically sealed package, and so on.

Being a non-linear resonator, the stiffness of actuator structure (e.g., springs, leaves, etc.) the MEMS mirror 12 changes as the tilt angle of the MEMS mirror 12 changes. Thus, the drive voltage of the MEMS mirror 12 will depend on the phase of the mirror due to the non-linearity of the mirror. While the measurements of the MEMS mirror properties are affected by external influences, they are not independent of each other due to the non-linearity of the MEMS mirror 12 and due to the dependency of the drive voltage on phase (i.e., of actuation relative to mirror position). Thus, an accurate means of measuring these properties is desired.

Figure 3:
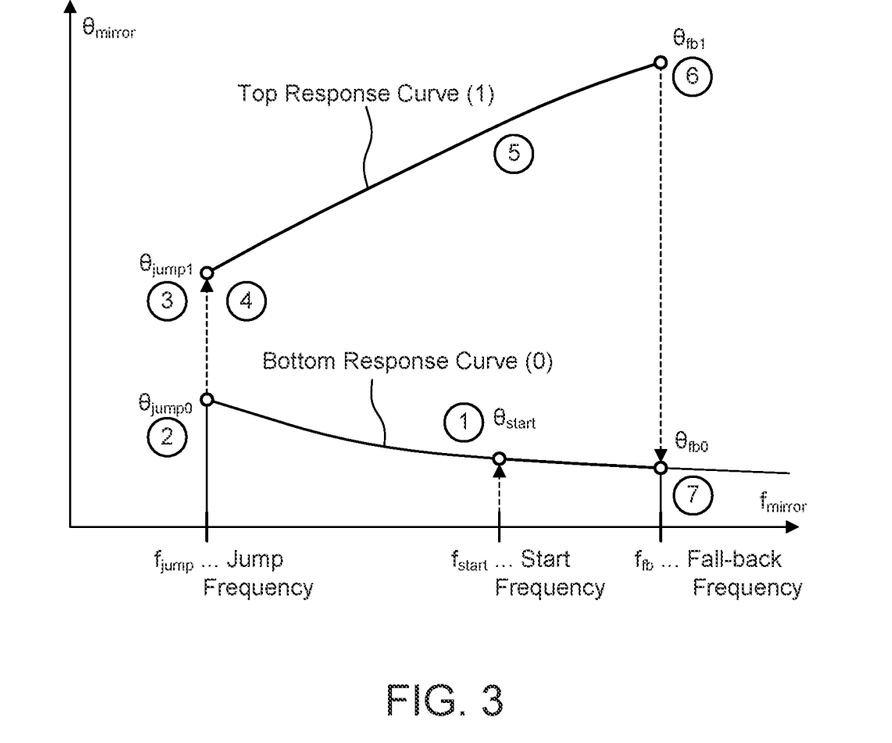
FIG. 3 illustrates a complete response curve of a micromirror device according to one or more embodiments.

FIG. 3 illustrates a complete response curve of a micromirror device according to one or more embodiments. Specifically, FIG. 3 plots the mirror angle $\theta_{mirror}$ vs. the mirror frequency $f_{mirror}$ of the MEMS mirror 12. Both axes in the plot are in arbitrary units. The complete response curve includes a top response curve (1) during which the mirror is in resonance and a bottom response curve (0) during which the mirror is not in resonance. The top response curve (1) may also be referred to as an operating response curve, where the frequency is swept across the operating range. In contrast, the bottom response curve (0) may be referred to as a non-operating response curve that exists before resonance is achieved (i.e., during nonstable oscillation). The complete response curve may be measured and stored in memory of the LIDAR system 200 (e.g., in the system controller 23).

The flow of the operation of the MEMS mirror progresses from point 1 to point 7, during which constant drive voltage is applied to the MEMS mirror 12 by the MEMS driver 25, will now be described. Here, "constant drive voltage" refers to the drive voltage being the same voltage when actuated (i.e., toggled on). However, it will be understood that the drive voltage is being toggled on and off in order to produce the mirror oscillation.

As noted in the previous paragraph, all points on the graph are operating at the same drive voltage provided by the MEMS driver 25. The drive voltage only stretches or compresses the curve (i.e., a higher frequency and a higher tilt angle can be reached due to more energy put it by a higher drive voltage).

The operation of the MEMS mirror starts at point 1 on the bottom response curve (0) where, at start frequency $f_{start}$. Here, the MEMS driver 25 starts the drive voltage signal to the MEMS mirror 12. In response, the MEMS mirror 12 will start to move a bit (e.g., at a low angle). However, mirror is not in phase, so not in resonance. Starting at the start frequency $f_{start}$, the mirror frequency is swept down (i.e., decreasing, right to left).

The frequency is lowered in order for the mirror to synchronize with the drive signal provided (i.e., to decrease the phase offset between the two). As more energy (i.e., constant drive voltage) is applied over time, the mirror continues to move slightly outside of resonance until the jump frequency $f_{jump}$ (point 2). That is, the mirror frequency continues to be lowered until resonance is found and the amplitude of the mirror oscillation increases at point 2 (180 phase shift, hence jump). At the jump frequency, the mirror phase shifts 180 degrees from $\theta_{jump0}$ (point 2) to $\theta_{jump1}$ (point 3) where the energy put in is transferred into motion.

At point 4, and the mirror frequency $f_{mirror}$ starts to sweep up (i.e., increasing, left to right). The mirror phase may continue to increase along the top response curve. At point 5, the mirror is in a stable operating region (in phase, but offset). The mirror may be in an optimal resonance at point 5. However, if the mirror frequency continues to increase to point 6, the mirror phase reaches a fallback phase $\theta_{fb1}$ at a fallback frequency $f_{fb}$. Thus, the tilt angle of the mirror is at a maximum just prior to this tipping point at point 6.

The fallback frequency $f_{fb}$ is the maximum frequency the mirror can maintain at the established drive voltage. The fallback point or tipping point is the point where the potential energy put in the mirror system by the drive voltage is equal to the kinetic energy opposing it by the mirror system (in phase, no offset), pushing it over this point disturbs the balance and resonance is lost. Thus, at point 6, there is not enough energy in the system to maintain the mirror phase and the phase shifts 180 degrees and falls back to the bottom response curve (0) at fallback phase $\theta_{fb0}$.

Point 7 is the fallback point on the bottom response curve (0) and is the phase angle the mirror falls back to. This phase angle is not necessarily zero degrees since the drive voltage is still present, but the mirror is no longer in phase. The cycle can start again at point 7 or at point 1.

In one or more embodiments, the MEMS driver 25 may be configured to sweep the frequency across the operating range (i.e., along the top response curve from point 3 to point 6) and record the tilt amplitude (tilt angle) of the MEMS mirror 12 in accordance with the measuring techniques described above. The MEMS driver 25 may also record the maximum tilt amplitude prior to reaching the fallback point.

Figure 4A:
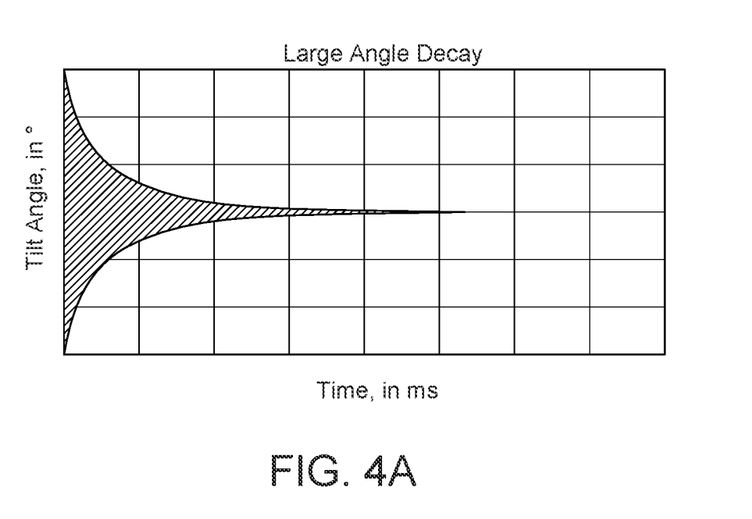
FIG. 4A illustrates a large angle decay of a micromirror device according to one or more embodiments.

FIG. 4A illustrates a large angle decay of a micromirror device according to one or more embodiments. Specifically, FIG. 4A plots the mechanical angle (degrees) of a MEMS mirror 12 vs. time (ms) as the mirror oscillates back and forth past its zero-angle. Both axes in the plot are in arbitrary units. The MEMS driver 25 or the system controller 23 may use the large angle decay to detect zero-crossing events and record the timing of these events during oscillation decay.

Figure 4B:
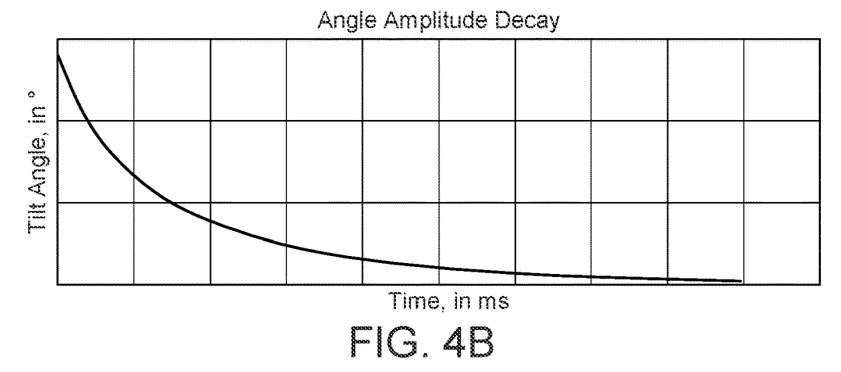
FIG. 4B illustrates a tilt angle amplitude decay curve of a micromirror device according to one or more embodiments.

FIG. 4B illustrates a tilt angle amplitude decay curve of a micromirror device according to one or more embodiments. Specifically, FIG. 4B plots the mechanical angle (degrees) of a MEMS mirror 12 vs. time (ms). Both axes in the plot are in arbitrary units.

Figure 4C:
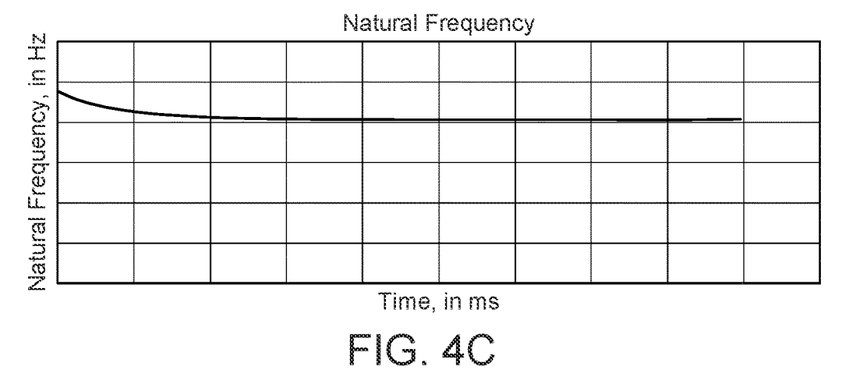
FIG. 4C illustrates a mirror frequency decay curve represented as a natural frequency of a micromirror device according to one or more embodiments.

FIG. 4C illustrates a mirror frequency decay curve represented as a natural frequency of a micromirror device according to one or more embodiments. FIG. 4C plots the natural frequency (Hz) of a MEMS mirror vs. time (ms). Both axes in the plot are in arbitrary units.

Figure 4D:
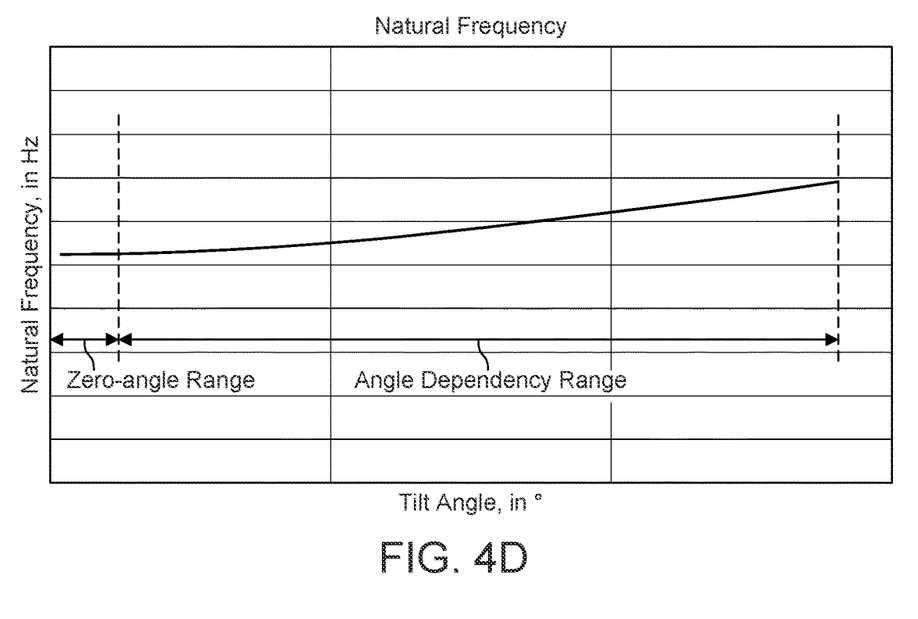
FIG. 4D illustrates a decay curve of an oscillation decay of a MEMS oscillating structure according to one or more embodiments.

From the two graphs provided in FIGS. 4B and 4C, the MEMS driver 25 or the system controller 23 can generate another graph illustrated in FIG. 4D, which again is in arbitrary units. Specifically, FIG. 4D illustrates the natural frequency (Hz) plotted against the tilt angle (degrees) during a decay of a micromirror device according to one or more embodiments. That is, the curve shown in FIG. 4C is plotted against the curve shown in FIG. 4B. The graph shown in FIG. 4D may be referred to as a decay curve of the oscillation decay of the MEMS mirror 12.

Decay measurements are performed by the MEMS driver 25 or the system controller 23 by using information represented in one or more of the graphs recorded during the oscillation decay. The graphs shown in FIGS. 4A-4D, or the information representative thereof may be stored in memory (e.g., a memory of the MEMS driver 25 or of the system controller 23). For example, the MEMS driver 25 may include a measurement circuit configured to measure at least one of a oscillation frequency (i.e., mirror frequency) and a tilt angle amplitude of the MEMS mirror 12 via the currents originating from the comb actuator structure during an oscillation decay.

The MEMS driver 25 may be configured to turn off toggling of the actuation signal (drive voltage) when the mirror is at a maximum tilt amplitude, and record information representative of the oscillation decay (e.g., tilt amplitude, mirror frequency, etc.). In particular, the decay measurement is performed by switching off the drive voltage slightly before point 6 at a predefined angle to trigger a controlled fallback instead of going over the tipping point. The oscillation slows down and the mirror eventually stops oscillating and reaches a standstill. In some cases, the actuation signal might need to be kept high enough to obtain measurement currents that are used to derive the capacitance of the actuator structure using measurement techniques described above. In other words, the actuation signal may be set lower than the drive voltage but not completely off in order to induce a controlled decay of the mirror. In either case, the MEMS driver 25 may record the mirror frequency (e.g., zero-angle frequency), tilt amplitude, and zero-crossing times, as well as derive other derivates such as a damping factor, decay slope ratios, Q-factor, and the like.

A deviation in the MEMS mirror properties when it oscillates with an amplitude close to zero, with respect to time or frequency can indicate a change in the response curve (e.g., the full response curve) indicating a change in the mirror properties. For example, the measured time or times of zero-crossing events determined over an oscillation decay can be compared to stored zero-crossing times corresponding to a stored response curve, and a deviation value can be derived. This deviation value may be compared to a threshold deviation value in order to evaluate the mechanical health of the MEMS mirror 12 or the state of the chip package. These measured times of zero-crossing events can also be used by the MEMS driver 25 to calculate a zero-angle frequency, a damping characteristic, and/or a Q-factor of the mirror.

The zero-angle frequency is a mirror frequency at which the MEMS mirror 12 oscillates when its oscillation amplitude is close to zero degrees, in this instance, it is measured during the oscillation decay period. As noted above, the mirror has an oscillation frequency that increases with oscillation amplitude due to the non-linearly of the suspension stiffening. Thus, the zero-angle frequency is different from, for example, a higher oscillation amplitude. Furthermore, the mirror frequency is at a minimum at the zero-angle frequency.

In another example, the zero-angle frequency may similarly be calculated over an oscillation decay compared to a stored zero-angle frequency corresponding to a stored response curve, and a deviation value can be derived. This deviation value in the zero-angle frequency recorded during oscillation decay that is outside a predetermined deviation range may indicate that MEMS mirror properties or chip package properties have shifted outside a normal range, and that the mirror or the chip package may be in need of repair or replacement.

Additionally, or alternatively, a decay time period can be measured, starting from when the actuation signal is turned off (or lowered) to induce the oscillation decay to a time when the mirror reaches a standstill. The measured decay time period can be compared to a previously recorded measured decay time period or to an expected decay time period corresponding to a stored response curve. The comparison result may produce a deviation value used to evaluate a mechanical health of the MEMS mirror 12 or the state of the chip package based on a predetermined deviation range. The measured decay time period can also be used to calculate a damping parameter and/or a Q-factor of the mirror.

Additionally or alternatively, a change in the response curve, for example, by measuring a mirror frequency at multiple tilt angles during a scan can be extrapolated by the MEMS driver 25 or the system controller 23 to a change in the zero-angle frequency.

Additionally or alternatively, the recorded tilt angle amplitude decay shown in FIG. 4B may be used to calculate a first angle decay slope at a high tilt angle on the graph and a second angle decay slope at a low tilt angle on the graph. The MEMS driver 25 or the system controller 23 may be configured to compare the first angle decay slope with the second angle decay slope, and evaluate the mechanical health of the mirror and/or the state of the chip package.

For example, the system controller 23 may calculate a ratio between the first angle decay slope and the second angle decay slope, and compare the ratio to a reference ratio to derive a difference value. The difference value may be used as an indicator of the mechanical health of the MEMS mirror 12 or the state of the chip package. In one example, the difference value may be compared to a predetermined threshold value, and if the difference value exceeds the predetermined threshold value, the system controller 23 may determine that the mechanical health of the MEMS mirror 12 is failing and should be repaired or replaced. Based on meeting this condition, the system controller 23 may signal to an operator that the MEMS mirror 12 should be repaired or replaced.

Additionally, or alternatively, the recorded tilt angle amplitude decay curve shown in FIG. 4B may be compared to a previously stored tilt angle amplitude decay curve, and a fit error may be calculated based on the comparison. The measured fit error can then be compared to a threshold value to derive a different value. If the difference value exceeds the predetermined threshold value, the system controller 23 may determine that the mechanical health of the MEMS mirror 12 is failing and should be repaired or replaced. Based on meeting this condition, the system controller 23 may signal to an operator that the MEMS mirror 12 should be repaired or replaced. A similar technique may be applied to any curve generated from the measurements from which a fit error is determined and evaluated.

In order to measure the frequency at a single point in a response curve, a single, well-defined angle is needed for use as a reference point. As mentioned above, FIG. 4D shows the decay curve which extends from a tilt angle of zero degrees to a maximum tilt angle. The slope near zero degrees (e.g., a zero-angle region defined between 0.0-0.5 degrees) is nearly horizontal, whereas the slope near the maximum is inclined. Thus, as the mirror angle increases beyond a zero-angle region, mirror frequency is dependent on mirror angle, whereas, inside the zero-angle region, the mirror frequency is independent of mirror angle.

Due to this phenomenon, the mirror frequency can be accurately measured near zero degrees without precisely knowing the mirror angle. That is, there is a region near zero degrees (e.g., 0.0-0.5 degrees) that provides flexibility in measuring the mirror frequency due to a low sensitivity to the mirror angle. As a result, this region near zero degrees may be referred to as a "zero-angle region" that is in proximity to zero degrees and the frequency measured in this region may be referred to as the "zero-angle frequency."

Thus, the zero-angle frequency can be recorded during each time the tilt angle of the MEMS mirror 12 is in this zero-angle region without knowing the precise tilt angle. Here, because the zero-angle region is a range of mirror angles, a dedicated time slot associated with the zero-angle region is used by the MEMS driver 25 to measure the zero-angle frequency in this range. The dedicated time slot may be during shut-down of the MEMS mirror 12 or during a specified time interval during operation of the MEMS mirror 12.

Since the Young's modulus of the mirror (e.g., the Young's modulus of the springs and leaves of the actuation structure) changes with temperature, there is a temperature dependency in measuring the mirror frequency. For example, mirror frequency typically changes by −4.8 Hz for each 50° C. increase. However, the decay curve or single point does not change with temperature induced variation in pressure (at least in first order); only drive voltage or phase changes. Thus, the system controller 23 may be coupled to a temperature sensor 26 to receive temperature measurements. The temperature sensor 26 may be included in the LIDAR scanning system 200, as shown in FIG. 2, or provided elsewhere. The decay measurements may then be compensated either at the MEMS driver 25 or at the system controller 23 to eliminate the influence of temperature. The compensated decay measurements can then be evaluated as described herein.

According to one or more embodiments, the hermeticity of the chip package may also be measured. For example, if a hermetic package leaks, then the pressure inside the chip package will change. In the case of the hermetic package being pressurized at room temperature to be less than atmospheric pressure (i.e., to have an "under-pressure"), the pressure inside the package would increase in the event or a leak. If the MEMS mirror 12 is not hermetically sealed, then pressure can vary with ambient pressure.

In addition, at high temperature, pressure would normally increase. An increase in pressure would require a higher drive voltage for a given operating point (i.e., for a given frequency/angle/phase) resulting from an increase in damping. An increase in pressure also leads to a lower Q-factor. Since a damping parameter and the Q-factor can be derived using the techniques described herein, a change in the damping parameter or a change in the Q-factor can be detected and evaluated by the MEMS driver 25 or the system controller 23. When evaluated, any changes may indicate a change in pressure. If the LIDAR scanning system 200 is hermetically sealed, then an increase in pressure can be detected and a leakage can be signaled to an operator.

Furthermore, as noted above, a constant drive voltage is used to drive the MEMS mirror 12. Thus, the mirror phase between the zero-crossing of the MEMS mirror 12 and the falling edge of the actuation signal can be used. If the mirror phase drifts towards zero, this may indicate an increase in pressure. In addition, a damping parameter and the Q-factor can be measured when the oscillation decays.

The MEMS driver 25 or the system controller 23 may be configured to determine a pressure inside the MEMS package based on at least one of the measured oscillation frequency and the measured tilt angle amplitude, and may be further configured to compensate the measured oscillation frequency and the measured tilt angle amplitude based on the determined pressure. A change in pressure may also be detected and signaled to an operator (e.g., in the event the change is caused by a leak from the chip package).

A method for measuring properties of a MEMS mirror having non-linearity is provided according to one or more embodiments. The method includes recording operating parameters (e.g., mirror frequency, mirror tilt amplitude, and mirror phase). This can be done by the LIDAR scanning system 200 at a specific large tilt angle (during normal operation of the MEMS mirror 12), or at the zero-angle range. From the measured mirror frequency, mirror tilt amplitude, and mirror phase, a complete response curve can be generated. The mirror frequency may be a zero-angle frequency. Optionally, the system 200 may compensate for temperature sensitivity (using actual measurement or an estimate of temperature). Optionally, the system may calculate one or more derivatives (e.g., damping parameters, Q-factors, zero-crossing times, decay slope ratios, etc.). They system 200 may compare one or more operating parameters or one or more derivatives to previously recorded operating parameter or derivative, respectively. The system 200 may then be configured to adjust one or more of the operating parameters, or indicate to an operator that preventive maintenance or replacement is recommended.

Figure 5:
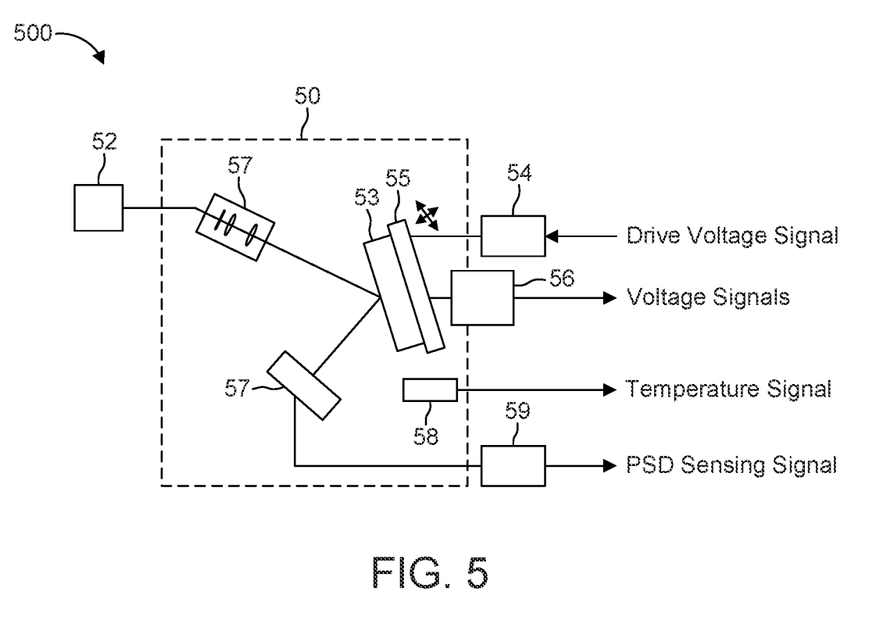
FIG. 5 shows a schematic block diagram of a test system according to one or more embodiments.
Figure 6:
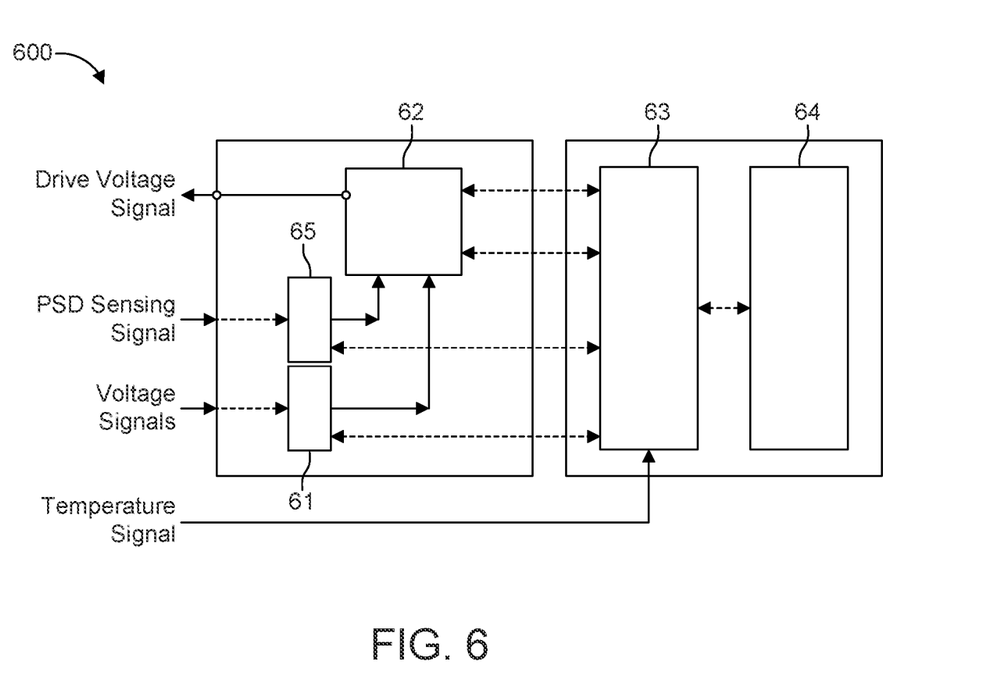
FIG. 6 shows schematic block diagram of a signal processing chain configured to transmit electrical signals to and receive electrical signals from the test system of FIG. 5 according to one or more embodiments.

FIG. 5 shows a schematic block diagram of a test system 500 according to one or more embodiments. FIG. 6 shows schematic block diagram of a signal processing chain 600 configured to transmit electrical signals to and receive electrical signals from the test system 500 according to one or more embodiments.

In particular, the test system 500 may include a test bench 50 configured to measure and record operating parameters (e.g., mirror frequency, mirror tilt amplitude, and mirror phase) of the MEMS mirror 12 by using similar measurement techniques described above. Much like the MEMS driver 25 or the system controller 23 described above, the test system 500 may generate a complete response curve from the measured mirror frequency, mirror tilt amplitude, and mirror phase. The test system may also calculate the mirror frequency may be a zero-angle frequency. Optionally, the test system 500 may compensate for temperature sensitivity (using actual measurement or an estimate of temperature). Optionally, the test system 500 may calculate one or more derivatives (e.g., damping parameters, Q-factors, zero-crossing times, decay slope ratios, etc.). The test system 500 may compare one or more operating parameters or one or more derivatives to previously recorded operating parameter or derivative, respectively. The test system 500 may then be configured to adjust one or more of the operating parameters, or indicate to an operator that preventive maintenance or replacement is recommended.

The test system 500 includes an optical stimulus 51 (i.e., a laser source) driven by a laser driver 52. The optical stimulus 51 is configured to fire a laser at the MEMS mirror 53. The MEMS mirror 53 may be driven by a drive signal provided by a MEMS driver 54. An open loop constant voltage (CV) circuit board 55 receives the drive signal and provides the driving voltage to the actuator structure of the MEMS mirror 53.

In addition, the MEMS mirror response is measured electrically to determine mirror frequency, mirror phase, and mirror current, and fed back into a control loop. For example, the open loop CV circuit board 55 is configured to output the currents originating from the comb actuator structure during an oscillation decay to a transimpedance amplifier 56. The transimpedance amplifier 56 converts the currents to voltages that are used for measuring the mechanical movement of the MEMS mirror 53 (e.g., mirror frequency and tilt amplitude).

The signal processing chain 600 is configured to receive the voltage signals from the transimpedance amplifier 56. In particular, a capacitor signal conditioning circuit 61 is configured to convert the voltage signals into capacitance measurement values. The capacitance measurement values are fed back into a function generator/phase-locked loop (PLL) control loop 62, that completes a mirror control loop, and also transmitted to a data acquisition unit 63.

The data acquisition unit 63 stores the capacitance measurement values and may also store previous measurement values, current and previsions response curves, etc. The data acquisition unit 63 also transmits the capacitance measurement values and/or response curves to a data analyzer 64 that is configured to analyze the mechanical health of the MEMS mirror 53 or the state of the chip package. The data analyzer 64 is configured to evaluate the mechanical health of the MEMS mirror 53 or the state of the chip package using any of the described techniques provided herein, and to output a result to an operator (e.g., via a display).

The test system 500 further includes a photo-sensitive detector 57 that is configured to receive a reflected laser, reflected by the MEMS mirror 53, and generate measurement signals in the form of electrical signals, much like the photodetector array 15 described above. The photo-sensitive detector (PSD) 57 may be configured to record an optical response from the reflected laser by generating electrical signals (i.e., PSD sensing signals) and sending the signals to a PSD driver 59. The PSD driver 59 may then transmit the PSD sensing signals to a PSD signal conditioning circuit 65, that then transmits processed PSD sensing signals to both the function generator/PLL control loop 62 and the data acquisition unit 63.

The data acquisition unit 63 stores the processed PSD sensing signals as measurement values and may also store previous measurement values, current and previsions response curves, etc. The data acquisition unit 63 also transmits the measurement values and/or response curves to a data analyzer 64 that is configured to analyze the mechanical health of the MEMS mirror 53 or the state of the chip package. The data analyzer 64 is configured to evaluate the mechanical health of the MEMS mirror 53 or the state of the chip package using any of the described techniques provided herein, and to output a result to an operator (e.g., via a display).

Although embodiments described herein relate to a MEMS device with a mirror, it is to be understood that other implementations may include optical devices other than MEMS mirror devices or other MEMS oscillating structures. In addition, although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the method steps may be executed by such an apparatus.

Depending on certain implementation requirements, embodiments provided herein can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein refers to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The above described exemplary embodiments are merely illustrative. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. A method of monitoring a microelectromechanical systems (MEMS) oscillating structure, the method comprising:
    driving the MEMS oscillating structure configured to oscillate about a rotation axis according to an operating response curve during which the MEMS oscillating structure is in resonance, wherein the MEMS oscillating structure is a non-linear resonator;
    inducing an oscillation decay of the MEMS oscillating structure at predefined tilt angle such that an oscillation of the MEMS oscillating structure decays from the predefined tilt angle over a decay period;
    measuring at least one characteristic of the oscillation decay; and
    determining a mechanical health of the MEMS oscillating structure based on the at least one characteristic of the oscillation decay.

2. The method of claim 1, wherein the at least one characteristic of the oscillation decay is an oscillation frequency of the MEMS oscillating structure during the decay period.

3. The method of claim 1, wherein the oscillation frequency is a zero-angle frequency of the MEMS oscillating structure.

4. The method of claim 3, further comprising:
    measuring the zero-angle frequency based on the MEMS oscillating structure oscillating through a zero-angle range during the oscillation decay.

5. The method of claim 4, further comprising:
    comparing the zero-angle frequency with an expected zero-angle frequency; and
    determining the mechanical health of the MEMS oscillating structure based on the comparison.

6. The method of claim 1, wherein the at least one characteristic of the oscillation decay is a tilt angle amplitude of the MEMS oscillating structure during the decay period.

7. The method of claim 6, further comprising:
generating a tilt angle amplitude decay curve based on the measured tilt angle amplitude;
comparing the tilt angle amplitude decay curve with an expected tilt angle amplitude decay curve; and
determining the mechanical health of the MEMS oscillating structure based on the comparison.

8. The method of claim 1, wherein the at least one characteristic of the oscillation decay is a duration of the decay period.

9. The method of claim 8, further comprising:
comparing the duration of the decay period with an expected duration of the decay period; and
determining the mechanical health of the MEMS oscillating structure based on the comparison.

10. The method of claim 1, wherein the at least one characteristic of the oscillation decay is an angle decay slope of the MEMS oscillating structure during the decay period.

11. The method of claim 10, further comprising:
comparing the angle decay slope with an expected angle decay slope; and
determining the mechanical health of the MEMS oscillating structure based on the comparison.

12. The method of claim 1, wherein the at least one characteristic of the oscillation decay includes a first angle decay slope of the MEMS oscillating structure initiated at a first predefined tilt angle and a second angle decay slope of the MEMS oscillating structure initiated at a second predefined tilt angle less than the first predefined tilt angle, and the method further comprises:
calculating a ratio between the first angle decay slope and the second angle decay slope;
calculating a difference between the determined ratio and a reference ratio; and
determining the mechanical health of the MEMS oscillating structure based the calculated difference.

13. The method of claim 12, further comprising:
comparing the calculated difference to a threshold value; and
generating a failure signal on a condition that the calculated difference exceeds the threshold value.

14. The method of claim 1, wherein the predefined tilt angle is a maximum tilt angle prior to a fallback point on the operating response curve.

15. The method of claim 1, wherein the decay period extends from a time the oscillation decay is induced to a time the MEMS oscillating structure reaches a standstill.

16. The method of claim 1, further comprising:
in response to the MEMS oscillating structure crossing the predefined tilt angle while the MEMS oscillating structure is in resonance about the rotation axis, triggering a decrease in a driving force used to drive the MEMS oscillating structure about the rotation axis, wherein the decrease in driving force induces the oscillation decay of the MEMS oscillating structure about the rotation axis.

17. The method of claim 1, wherein a tilt angle amplitude of the MEMS oscillating structure oscillates between two extrema that are maintained substantially constant during resonance about the rotation axis and that are continuously decreased in magnitude for each successive oscillation of the MEMS oscillating structure during the oscillation decay about the rotation axis.

* * * * *